United States Patent
Lahav et al.

(10) Patent No.: US 7,236,779 B2
(45) Date of Patent: Jun. 26, 2007

(54) CLASSIFICATION OF CELLULAR NETWORK DRIVE TEST RESULTS

(75) Inventors: Shlomo Lahav, Ramat Gan (IL); Gil Shafran, Jerusalem (IL); Roni Abiri, Ra'anana (IL); Tal Dunsky, Kadima (IL); Vered Hornblass, Elkana (IL)

(73) Assignee: Schema Ltd., Herzlia (IL)

( * ) Notice: Subject to any disclaimer, the term of this patent is extended or adjusted under 35 U.S.C. 154(b) by 1008 days.

(21) Appl. No.: 10/391,437

(22) Filed: Mar. 18, 2003

(65) Prior Publication Data

US 2004/0203725 A1 Oct. 14, 2004

Related U.S. Application Data

(60) Provisional application No. 60/369,368, filed on Apr. 1, 2002.

(51) Int. Cl.
*H04Q 7/22* (2006.01)
*H04B 17/00* (2006.01)

(52) U.S. Cl. .............. 455/423; 455/424; 455/446; 455/67.11

(58) Field of Classification Search ............ 455/422.1, 455/423, 424, 446, 67.11, 67.13, 67.14
See application file for complete search history.

(56) References Cited

U.S. PATENT DOCUMENTS

| | | | |
|---|---|---|---|
| 5,293,640 A | 3/1994 | Gunmar et al. | |
| 5,437,054 A | 7/1995 | Rappaport et al. | |
| 5,465,390 A | 11/1995 | Cohen | |
| 5,530,910 A | 6/1996 | Taketsugu | |
| 5,774,790 A | 6/1998 | Dupuy | |
| 5,809,423 A | 9/1998 | Benveniste | |
| 5,839,074 A | 11/1998 | Plehn | |
| 5,920,607 A | 7/1999 | Berg | |

(Continued)

FOREIGN PATENT DOCUMENTS

EP 0 490 554 6/1992

(Continued)

OTHER PUBLICATIONS

R. Abiri, "Enhancing GSM/GPRS Capacity and Quality of Service", the 5th Annual International Congress GSM-GPRS Asia Pacific, Sep. 2001, Singapore.

(Continued)

*Primary Examiner*—Harry S. Hong
(74) *Attorney, Agent, or Firm*—Ladas and Parry LLP

(57) ABSTRACT

A method for analyzing service in a wireless communication network, which includes multiple antennas, which are assigned to transmit signals over the air to mobile units on respective sets of one or more frequency channels, such that at least two of the antennas transmit the signals on a common frequency channel. The method includes recording levels of the signals received at multiple locations within a service area of the network, while the antennas are transmitting the signals on the respective sets of frequency channels, including simultaneous transmission by the at least two of the antennas on the common frequency channel. The recorded levels and the frequency channels of the received signals are analyzed so as to classify the received signals at each of the locations according to the antennas transmitting the signals.

54 Claims, 3 Drawing Sheets

U.S. PATENT DOCUMENTS

| | | | |
|---|---|---|---|
| 5,926,762 A | 7/1999 | Arpee et al. | 455/447 |
| 5,946,612 A | 8/1999 | Johansson | |
| 6,072,778 A | 6/2000 | Labedz et al. | |
| 6,154,655 A | 11/2000 | Borst et al. | |
| 6,167,240 A | 12/2000 | Carlsson et al. | |
| 6,205,336 B1 | 3/2001 | Ostrup et al. | |
| 6,253,065 B1 | 6/2001 | Palmer | |
| 6,272,352 B1 | 8/2001 | Cerwall et al. | |
| 6,308,071 B1 | 10/2001 | Kalev | |
| 6,336,035 B1 | 1/2002 | Somoza et al. | |
| 6,385,457 B1 | 5/2002 | Dam et al. | |
| 6,405,020 B1 | 6/2002 | Oestreich et al. | |
| 6,405,043 B1 | 6/2002 | Jensen et al. | 455/446 |
| 6,411,819 B1 | 6/2002 | Gutowski | |
| 6,424,643 B1* | 7/2002 | Gutowski | 370/342 |
| 6,480,716 B2 | 11/2002 | Salonaho | |
| 6,487,414 B1 | 11/2002 | Tanay et al. | |
| 6,522,888 B1* | 2/2003 | Garceran et al. | 455/456.3 |
| 6,526,039 B1 | 2/2003 | Dahlman et al. | |
| 6,539,221 B1 | 3/2003 | Vesudevan et al. | |
| 6,614,778 B1 | 9/2003 | Hwang | |
| 6,625,132 B1* | 9/2003 | Boettger et al. | 370/329 |
| 6,754,487 B1* | 6/2004 | Sanders et al. | 455/423 |
| 6,918,063 B2 | 7/2005 | Ho et al. | |
| 6,970,682 B2* | 11/2005 | Crilly et al. | 455/78 |
| 2001/0001762 A1 | 5/2001 | Frodigh et al. | |
| 2002/0061731 A1 | 5/2002 | Takano et al. | |
| 2002/0068581 A1 | 6/2002 | Salonaho | |
| 2002/0107024 A1 | 8/2002 | Dev | |
| 2003/0148765 A1 | 8/2003 | Ma et al. | |
| 2004/0121777 A1 | 6/2004 | Schwartz et al. | |

FOREIGN PATENT DOCUMENTS

| | | |
|---|---|---|
| GB | 2334185 | 8/1999 |
| WO | WO 93/15569 | 8/1993 |
| WO | WO 98/53621 | 11/1998 |
| WO | WO 01/59936 | 8/2001 |
| WO | WO 01/72072 | 9/2001 |

OTHER PUBLICATIONS

William Feller, "An Introduction to Probability Theory and its Applications", vol. 1, John Wiley & Sons, Chapter XV, pp. 372-427, 1950.

A. Papoulis, "Probability, Random Variables and Stochastic Processes", McGraw-Hill Book Company, Chapter 15, pp. 528-551, 1965.

Michalewicz, Genetic Algorithms +Data Structures =Evolution Programs, Springer, Berlin, 1996.

Goldberg, The Design of Innovation: Lessons from and for Competent Genetic Algorithms, Kluwer, Boston, 2002.

ACC/AHA/ESC Practice Guidelines—Executive Summary, Journal of the American College of Cardiology, vol. 38, No. 4, 2001.

Morady F, Kadish, et al., "Effects of resting vagal tone on accessory atrioventricular connections", Circulation 1990, (an abstract).

Lew SJ, Jim JK, "Stroke prevention in elderly patients with atrial fibrillation", Singapore, 2002, (an abstract).

Gregory S. Friedrichs, "Experimental models of atrial fibrillation/flutter", Journal of Pharmacological and Toxicological Methods, 43 (2000) 117-123.

Maurits C.E.F. Wijffels, et al., "Atrial Fibrillation Begets Atrial Fibrillation", Circulation 1995, (an abstract).

Youhua Zhang, et al., "Optimal ventricular rate slowing during atrial fibrillation by feedback A V nodal-selective vagal stimulation", Am J Physiol Heart Circ Physiol 282: H1102-H1110, 2002.

Wijffels MC, et al., "Electrical remodeling due to atrial fibrillation in chronically instrumented conscious goats: roles of neurohumoral change; ischemia, atrial stretch, and high rate of electrical activation", Circulation 1997, (an abstract).

Matthew S. Waninger, et al., "Electrophysiological Control of Ventricular Rate During Atrial Fibrillation", Pace, vol. 23, Aug. 2000.

Walter C. Randall, Neural Regulation of the Heart, Oxford University Press, New York, 1977.

Matthew N. Levy, et al., "Vagal Control of the Heart: Experimental Basis and clinical Implications", The Bakken Research Center Series, vol. 7, 2002.

Aristidis Likas, Andrea Stafylopatis, "A Parallel algorithm for the minimum weighted vertex cover problem", Jun. 20, 1992, National Technical University of Athens, pp. 1-6.

* cited by examiner

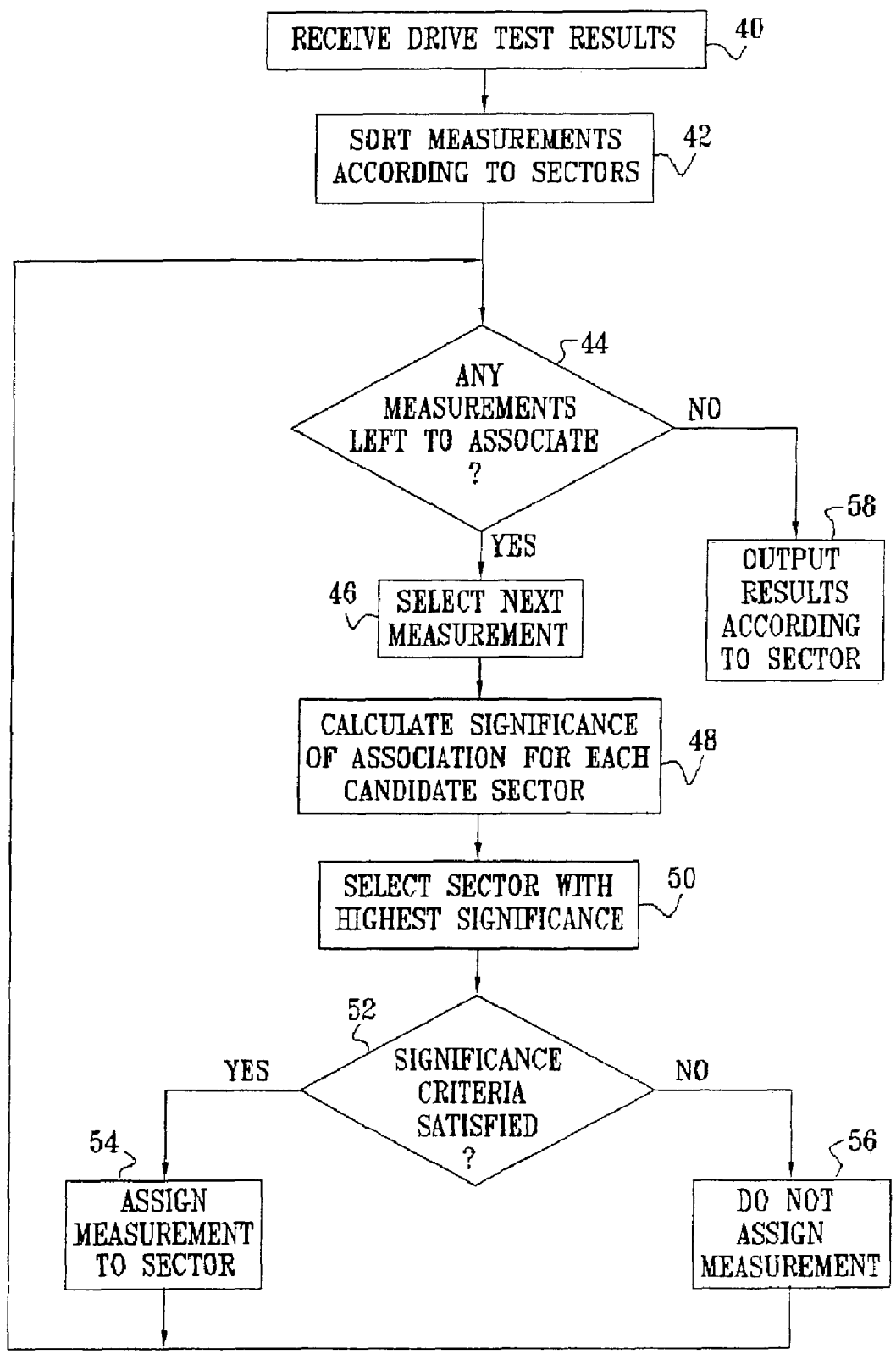

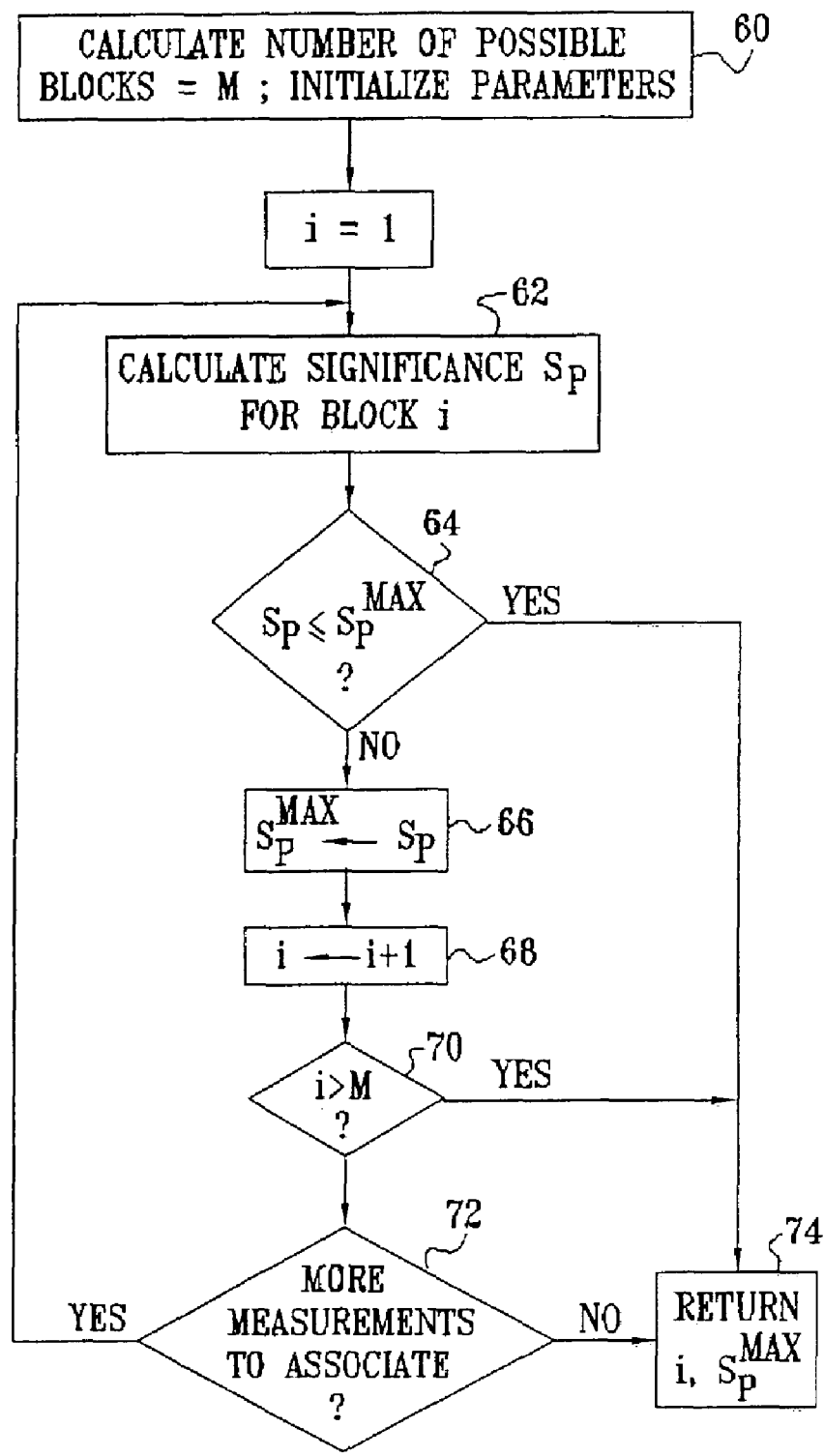

CLASSIFICATION OF CELLULAR NETWORK DRIVE TEST RESULTS

CROSS-REFERENCE TO RELATED APPLICATION

This application claims the benefit of U.S. provisional patent application 60/369,368, filed Apr. 1, 2002, which is incorporated herein by reference.

FIELD OF THE INVENTION

The present invention relates generally to evaluation of resource use in wireless communication networks, and specifically to evaluating results of local signal level measurements in such networks.

BACKGROUND OF THE INVENTION

In a cellular communication network, the region served by the network is divided into a pattern of cells. Each cell has one or more antennas that communicate with mobile units (cellular telephones and/or data terminals) within its service area. The cell may be divided into sectors, each of which is typically served by a different antenna. In the context of the present patent application, the terms "cell" and "sector" are used interchangeably. The present invention deals with classifying signals received at various locations in the service region of the network according to the antenna transmitting the signals. (Such operations are also referred to herein as assigning the received signals to antennas, or associating the signals with antennas). In the context of a cellular network, it will be understood that classifying the signals according to the transmitting antenna has substantially the same meaning as classifying the signals according to cell or sector.

Each cell in a narrowband cellular network is assigned a fixed set of frequencies, also referred to as channels. Narrowband networks currently in use include primarily Time Division Multiple Access [TDMA] networks, such as Global System for Mobile [GSM] communication networks. In such networks, each traffic channel may be further divided into time slots, while control channels are transmitted continuously. (In contrast, Code Division Multiple Access [CDMA] networks assign a broad frequency band to each cell, and all operating channels are generally transmitted continuously.) In order to reduce interference between calls, the frequency channels in a narrowband cellular network are typically distributed among the different cells so that nearby cells use different channels.

The strengths of the signals reaching the mobile units from the antennas, and vice versa, are determined by the path loss of electromagnetic waves propagating between the antennas and the mobile unit locations. If the received signal level at a given location is too low, poor quality or coverage holes will result. On the other hand, during a call between a given mobile unit and a given antenna, the power of the traffic signals transmitted by the antenna on the channel or slot serving the mobile unit may be intentionally reduced, by a mechanism known as transmission power control (TPC). The object of this mechanism is to reduce interference with other calls on the same channel or adjacent channels in other nearby cells, while still providing the given mobile unit with a sufficient carrier/interference (C/I) ratio.

Because of the limited available spectrum, channel allocation generally involves tradeoffs between coverage of the service area and potential interference between different cells. If an inadequate number of channels are available at the location, calls will be blocked or dropped. On the other hand, if cells whose service areas overlap significantly use the same channels, mobile units in the overlap area will experience substantial interference. Therefore, an accurate map of cell service areas and signal strengths can be very useful in optimizing cellular network performance.

In planning cellular networks, path loss maps are typically used to locate and orient the antennas and determine channel allocations and transmission power levels. Such maps may be based on analysis of the topography and other characteristics of the network service area. In actual operation, however, the transmitted signals are subject to variable and unexpected attenuation, and the a priori path loss estimates are rarely completely accurate. To get a better picture of the actual distribution of cellular signals transmitted by the various antennas, cellular operators use drive tests, in which the actual antenna signals are measured at different locations by a test van driving through the service region.

At any location in the service region that is visited by the test van, it is likely to measure signals on multiple different frequency channels. The source of a signal on a given channel at a given location may be ambiguous, since as noted above, multiple cells may transmit on the same channel, and the received power is subject to TPC and fading, which may be difficult to predict. This problem can be resolved in part by assigning each cell a particular "color code," i.e., a signal pattern that distinguishes its signals from those of other cells. In practice, however, the color code is not always available. Therefore, correctly associating each drive test measurement with a transmitting cell may be a difficult task.

U.S. Pat. Nos. 5,926,762 and 6,405,043, whose disclosures are incorporated herein by reference, describe methods for interference prediction and frequency planning for cellular networks based on drive test results. In order to avoid ambiguity in associating the signals measured in the drive test with the transmitting antennas, a single channel is transmitted from each cell site or sector, and all cells in the test area transmit on different channels. By transmitting from each cell on a single, unique channel, interference that might complicate the readings is eliminated, so that the cell from which any channel is transmitted is positively known. By implication, however, this test method can be carried out only when the cellular network is off-line, serving only the drive test and not serving network customers (or at best serving the customers on a very limited basis permitted by the restricted, single-channel spectrum allocated to each cell or sector.) There remains a need for a reliable method for processing drive test measurements that are gathered while the network is in normal operation.

SUMMARY OF THE INVENTION

The present invention provides methods and systems for analyzing drive test results in a wireless communication network, so as to classify the signals measured at different locations according to the antennas that actually transmitted the signals. Unlike methods known in the art, implementation of the present invention does not require that the cellular network be taken off line or that network operations be modified in any way during the drive test. Rather, the methods of the present invention can be used under the variable conditions of actual network operation, in which each antenna may transmit on multiple channels, and multiple different antennas, in different sectors, may transmit on the same channel or channels.

In embodiments of the present invention, drive test results are analyzed iteratively in order to classify each signal measured according to the antenna most likely to have transmitted it. Typically, the classification process makes use of known transmission characteristics of the cellular network under test, such as the allocation of control and traffic channels to particular sectors, and the estimated path loss from each antenna to the location of a given measurement. The measured signals on the various channels are thus sorted into groups according to the antennas from which they could have been transmitted, based on the known network characteristics.

For each measurement or set of measurements at each location in the network service region, a metric is calculated for each possible transmitting antenna, indicating the likelihood that the measured signal was transmitted by that antenna. Based on these metrics, the measurements are then assigned in sequence to the antennas, typically (although not necessarily) beginning with the strongest measurement on the list and working down. After each measurement or set of measurements is assigned, the metrics for the remaining measurements may be recalculated. In this manner, substantially all the measurements may be reliably classified with the correct transmitting antennas, including weak signals transmitted from distant antennas or arising due to interference from neighboring frequency channels.

The methods and systems of the present invention are applicable to both narrowband cellular networks (such as TDMA and GSM) and to broadband cellular networks (such as CDMA). Furthermore, although the embodiments described herein refer specifically to drive tests made in a cellular communication network, the methods of the present invention may similarly be applied to analysis of signal strength measurements at different locations in other types of wireless networks.

There is therefore provided, in accordance with an embodiment of the present invention, a method for analyzing service in a wireless communication network, which includes multiple antennas, which are assigned to transmit signals over the air to mobile units on respective sets of one or more frequency channels, such that at least two of the antennas transmit the signals on a common frequency channel, the method including:

recording levels of the signals received at multiple locations within a service area of the network, while the antennas are transmitting the signals on the respective sets of frequency channels, including simultaneous transmission by the at least two of the antennas on the common frequency channel; and analyzing the recorded levels and the frequency channels of the received signals so as to classify the received signals at each of the locations according to the antennas transmitting the signals.

Typically, recording the levels of the signals includes recording the levels using a receiver mounted in a vehicle, while the vehicle travels through the service area. The wireless communication network typically includes a cellular network, and analyzing the recorded levels and the frequency channels includes classifying the received signals as originating from cells or sectors of the cellular network that are respectively served by the antennas. Classifying the received signals may further include decoding a color code that is encoded in at least some of the signals, and assigning the signals to the cells or sectors responsively to the color code.

Typically, recording the levels includes recording first and second levels of first and second signals received at one of the locations on first and second frequency channels, respectively, and analyzing the recorded levels and the frequency channels includes classifying the first signal as having originated from one of the antennas and, responsively to having classified the first signal, classifying the second signal.

In an embodiment of the invention, classifying the first signal includes computing a first metric with respect to the first signal, indicative of which of the antennas is likeliest, among the antennas transmitting on the first frequency channel, to have transmitted the first signal, and determining a classification of the first signal responsively to the first metric, and classifying the second signal includes computing a second metric, indicative of which of the antennas is likeliest, among the antennas transmitting on the second frequency channel, to have transmitted the second signal, wherein the second metric is computed subject to the classification of the first signal.

When the first signal is classified as having originated from a first one of the antennas, classifying the second signal may include classifying the second signal as having originated from a second one of the antennas, different from the first one. Alternatively, classifying the second signal may include classifying the second signal as having originated from the first one of the antennas, in addition to the first signal having originated therefrom.

Additionally or alternatively, recording the levels may further include recording a third level of a third signal received at the one of the locations on a third frequency channel, and analyzing the recorded levels and the frequency channels may include classifying the third signal responsively to having classified the first and second signals.

In a disclosed embodiment, analyzing the recorded levels and the frequency channels includes sorting the recorded levels so as to generate a respective list, for each of at least some of the antennas, including measurements of the levels of the signals recorded at the one of the locations on the respective sets of frequency channels that are assigned to the antennas, and classifying the received signals based on the list. Typically, classifying the received signals includes computing a metric with respect to a group of the measurements in the respective list generated with respect to at least one of the antennas, wherein the metric is indicative of a likelihood that the at least one of the antennas transmitted the signals whose measurements are included in the group, and determining a classification of at least a first signal in the respective list responsively to the metric. Computing the metric may include computing multiple, respective metrics for multiple groups of the measurements, and selecting a maximal metric from among the multiple metrics.

Typically, the at least two of the antennas transmitting on the common frequency channel include first and second antennas, and wherein analyzing the recorded levels and the frequency channels includes computing respective first and second metrics, indicative of which of the first and second antennas is likelier to have transmitted a signal that was received on the common frequency channel, and classifying the signal based on the first and second metrics. In one aspect of the invention, computing the respective first and second metrics includes estimating respective probabilities of error in assigning the signal to each of the first and second antennas.

In another aspect of the invention, when the first and second antennas are assigned to transmit the signals on first and second frequency channels, which are mutually adjacent, and wherein the common frequency channel is the first frequency channel, computing the second metric includes adjusting the second metric responsively to the transmission by the second antenna on the second, adjacent frequency channel.

In a further aspect of the invention, computing the first and second metrics includes comparing the signal that was received on the common frequency channel to respective estimated path loss characteristics associated with the transmission of the signal from each of the first and second antennas, and adjusting the metrics in response to the path loss characteristics.

In another disclosed embodiment, analyzing the recorded levels and the frequency channels includes calculating a probability that a first signal transmitted by a first one of the at least two antennas is masked by a second signal transmitted by a second one of the at least two antennas, and classifying the signals based on the probability.

Additionally or alternatively, analyzing the recorded levels and the frequency channels further includes estimating a received signal strength indicator (RSSI) with respect to at least one of the antennas.

There is also provided, in accordance with an embodiment of the present invention, apparatus for analyzing service in a wireless communication network, which includes multiple antennas, which are assigned to transmit signals over the air to mobile units on respective sets of one or more frequency channels, such that at least two of the antennas transmit the signals on a common frequency channel, the apparatus including a test processor, which is adapted to receive levels of the signals measured at multiple locations within a service area of the network, while the antennas are transmitting the signals on the respective sets of frequency channels, including simultaneous transmission by the at least two of the antennas on the common frequency channel, and which is adapted to analyze the levels and the frequency channels of the measured signals so as to classify the measured signals at each of the locations according to the antennas transmitting the signals.

There is additionally provided, in accordance with an embodiment of the present invention, a computer software product for analyzing service in a wireless communication network, which includes multiple antennas, which are assigned to transmit signals over the air to mobile units on respective sets of one or more frequency channels, such that at least two of the antennas transmit the signals on a common frequency channel, the product including a computer readable medium, in which program instructions are stored, which instructions, when read by a computer, cause the computer to receive levels of the signals measured at multiple locations within a service area of the network, while the antennas are transmitting the signals on the respective sets of frequency channels, including simultaneous transmission by the at least two of the antennas on the common frequency channel, and further cause the computer to analyze the levels and the frequency channels of the measured signals so as to classify the measured signals at each of the locations according to the antennas transmitting the signals.

The present invention will be more fully understood from the following detailed description of the preferred embodiments thereof, taken together with the drawings in which:

BRIEF DESCRIPTION OF THE DRAWINGS

FIG. 2 is a flow chart that schematically illustrates a method for classifying drive test measurements according to sectors of a cellular network, in accordance with an embodiment of the present invention; and FIG. 3 is a flow chart that schematically illustrates a method for computing significance metrics used in classifying drive test measurements in a cellular network, in accordance with an embodiment of the present invention.

DETAILED DESCRIPTION OF EMBODIMENTS

Figure 1:
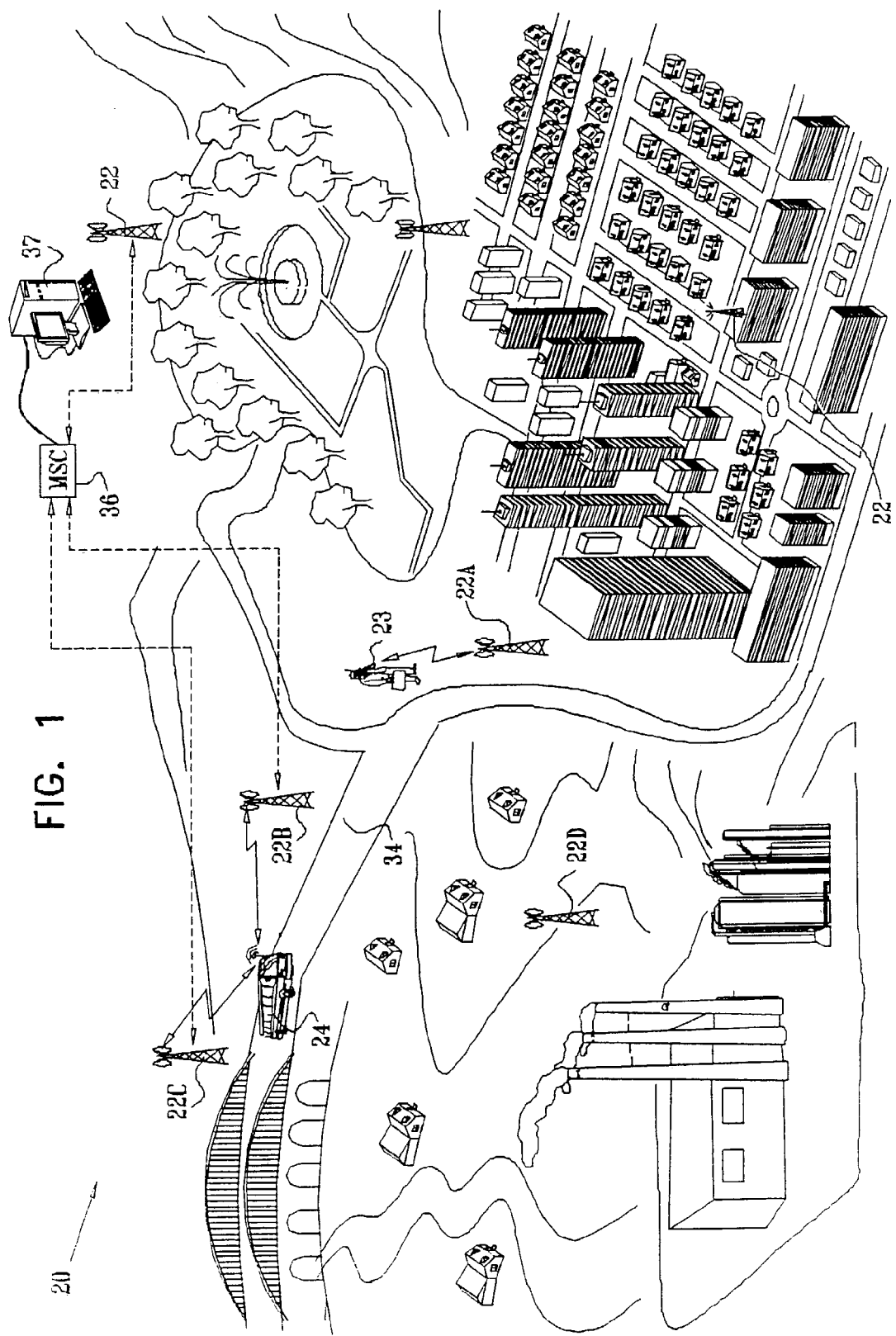
FIG. 1 is a schematic, pictorial illustration of a drive test conducted in a region served by a cellular communication network, in accordance with an embodiment of the present invention.

FIG. 1 is a schematic, pictorial view of a region 20 served by a cellular communication network, in which drive test measurements are made and analyzed in accordance with an embodiment of the present invention. For the purposes of the cellular network, region 20 is divided into partly-overlapping cells, each served by one or more fixed transceivers, represented by antennas 22. The cells may be further divided into sectors, each of which is typically served by a single antenna. By way of example, an antenna 22 A serves a sector, which will be referred to as sector A, in which a mobile unit 23 is being used to carry on a telephone call. Another antenna 22B serves a neighboring or nearby sector, which will be referred to as sector B. In the course of a telephone call, particularly while traveling, mobile unit 23 may be handed over from cell to cell, as is known in the art. Communication traffic in the cellular network serving region 20 is controlled and routed among antennas 22 by a mobile switching center (MSC) 36 or a base station controller (BSC—not shown).

To perform a drive test of the cellular network, a test van 24, driving on roads 34 through region 20, is used to collect statistics regarding the strengths of signals transmitted by different antennas 22 at many different locations in the region. At each location on the drive test, van 24 measures the strengths of the signals it receives at different frequencies, typically monitoring all the frequency channels used by the network. Thus, each measurement recorded by the test van includes location coordinates, channel, received power level and, in some cases, the color code of the signal. Alternatively or additionally, other types of mobile test devices, including the mobile units themselves, may be used to measure signal levels and report their results.

There are certain differences between the parameters that are commonly recorded in drive tests of narrowband cellular networks, such as TDMA and GSM networks, and those used in broadband cellular networks, such as CDMA networks. For example, in broadband cellular networks, the "cell code" is recorded and used in place of the color code. Therefore, references to color codes in the description and claims below should be understood as comprehending cell codes, as appropriate. As another example, whereas narrowband network drive tests generally measure absolute signal levels, in broadband networks the signal levels are typically measured relative to the overall interference or noise. Hence, references in the present patent application and in the claims to measuring or recording of levels should be understood to comprehend both absolute and relative measurements. Taking these differences into account, the methods of the present invention may be applied in a straightforward fashion to both narrowband and broadband networks.

The drive test and/or other mobile measurement results are passed to a drive test processor 37 for analysis, in order to classify the measured signals according to the antennas that are likeliest to have transmitted them. In order to analyze the drive test results, processor 37 receives network control information from MSC 36 and/or other information concerning the network configuration. For example, processor 37 typically receives information regarding the allocation of traffic and control channels among antennas 22, as well as color codes assigned to the channels, where applicable. While control channels are generally transmitted at all times, without transmission power control (TPC), traffic channels may be transmitted intermittently, with or without TPC (or even with TPC applied to some time slots but not others), depending on the network type and service policies.

Channels may also be prioritized by the network, so that the traffic channels assigned to a given sector will be activated according to need, in order of descending priority. The priorities, taken together with traffic density, thus determine the probability that a given antenna will transmit on a particular channel at any given time. Furthermore, based on priority information, processor 37 may decide not to associate a measurement with a particular candidate sector, when the measurement was made on a channel that has a low priority in the candidate sector, and no signal was detected simultaneously on a higher-priority channel for the same sector.

In associating the measurements with the transmitting antennas, processor 37 also uses the known transmission power of antennas 20 and path loss characteristics of region 20. Some of this information may be provided by path loss maps, showing the attenuation of electromagnetic waves propagating between each of the antennas and different mobile unit locations in region 20. Path losses may vary substantially over time, however, so that path loss maps can provide only approximate information. Furthermore, for traffic channels, the transmitted signal power may vary substantially due to TPC. These factors add ambiguity in associating measurements with antennas based on measured signal power levels.

The minimum path loss possible between a transmitting antenna and the receiver is the free-space path loss, which is determined by the distance between the antenna and the receiver, without considering attenuating factors such as topographical characteristics, clutter and weather. If the power level of a measured signal at some location is greater than the maximum transmitted power less the free-space path loss from a particular candidate antenna to the measurement location, then the signal should not be associated with that antenna. Similarly, the signal should not be associated with a candidate antenna if the measured signal level is much greater (typically 30 dB or more) than the level predicted by the path loss map for that antenna.

Processor 37 processes the signal level information throughout region 20 in order to classify each measurement according to its transmitting antenna, and thus to generate a map of signal propagation in the network for each sector or cell. Processor 37 typically comprises a general-purpose computer, which performs these functions under the control of software supplied for this purpose. The software may be conveyed to the computer in electronic form, over a network, for example, or it may be furnished on tangible media, such as CD-ROM. Alternatively or additionally, processor 37 may comprise a dedicated hardware processor, or a combination of hardware and software-based processing elements.

At the most general level, the function of processor 37 can be seen as finding the most probable hypothesis relating the n channel measurements made at each measurement location in region 20 to the m sectors of the cellular network. Formally, we define the set of measurements made at a given location as $$X = \{x_i\}_{i=1}^n.$$

Each measurement $x_i$ comprises a tuple $(f_i, c_i, w_i)$ of the received channel $f_i$, the color code $c_i$ (if present and decoded) and the measured power $w_i$. Any classification of the measurement with a transmitting antenna must accord with a "world state" $W_{I \times J}$, defining the set of channels F transmitted by all sectors S. Each such world state $W_{I \times J}$ can be represented as an n×m binary matrix defining a specific channel allocation in each of the sectors in the network. (An element (i,j) of $W_{I \times J}$ is one if channel i is transmitted by sector j.)

All the measurements in X are assigned to unique, respective sectors by finding the most probable world state given the set of measurements. The probability of each world state is given by:

$$p(W_{I \times J} \mid X) = \frac{p(X \mid W_{I \times J}) p(W_{I \times J})}{p(X)} \qquad (1)$$

The most probable hypothesis $H_{B_I \times B_J}$ for assignment of the measurements I to sectors J is given by maximum likelihood estimation as:

$$B_I \times B_J = \arg\max_{I \times J} \sum_{i=1}^{n} \log[p(x_i \mid W_{I \times J})] + \log[p(W_{I \times J})] \qquad (2)$$

This estimation may be performed over all world states, with respect to all locations at which measurements were made. This method, while accurate and complete, requires checking a great many probable world states. Therefore, in the embodiments of the present invention described below, the set of world states is defined per channel, and the measurements are assigned to the likeliest transmitting antennas on a channel-by-channel basis. Defining $V_{i,j}$ as the world state in which channel i was received from sector j, the most probable hypothesis $H_{i,B_i}$ for assignment of the measurements on channel i is given by:

$$B_i = \arg\max_{j} p(x_i \mid V_{i,j}) p(V_{i,j}) \qquad (3)$$

The probability that this assignment is erroneous is given by:

$$p(H_{i,B_i} \mid V_{i,k} \text{ for } k \neq B_i) \qquad (4)$$

Based on this model, processor 37 assigns the measurements made on all channels at a given location to respective sectors using an iterative process. First, the processor finds the likeliest assignment hypothesis for one or several of the applicable channels, based on a metric that is indicative of the likelihood of error of each assignment. Exemplary methods for calculating likelihood metrics that can be used for this purpose are described hereinbelow. Probability of service and channel prioritization, as mentioned above, may also be factored into the likelihood metrics. The channel assignment with highest confidence (i.e., lowest error probability) is chosen, and is used as a basis for recalculating the world state probabilities and error probabilities of the remaining channels. The next most confident assignment is then found, and the process is repeated until all possible channels have been assigned with high confidence.

After assigning the drive test measurements at each location to respective sectors, the assignments at neighboring location may be rechecked against one another to ensure that they together define a reasonable world state, i.e., that they do not conflict with one another. (Such a conflict could arise, for example, when the measurement on a given channel at one point is assigned to a certain sector, while the measurements on the same channel at all the surrounding points are assigned to a different sector). Incorrect classifications that are discovered in this manner may be removed, and possibly replaced with the correct classifications.

FIG. 2 is a flow chart that schematically illustrates a method for classifying drive test signal measurements at a given location according to the sectors transmitting the signals, in accordance with an embodiment of the present invention. This process is equivalently referred to as assigning the measurements to sectors, or associating the measurements with sectors, and the terms "classifying," "assigning," and "associating" measurements are used here interchangeably. Processor 37 receives the drive test measurements, at a result submission step 40. As noted above, the processor typically also receives other network information to use in the analysis, such as channel assignments and path loss estimates.

The processor then sorts the measurements made at each location by sector, at a sorting step 42. The object of this sorting step is to generate a list, for each sector, of all the measurements that could have originated from that sector. If a particular measurement includes a color code, then the measurement is sorted only into the lists of sectors using that color code. A measurement made on a given frequency channel can be placed on the list for a particular sector only if the sector is known to transmit signals on this frequency channel (based on the network channel assignments), or if it transmits on an adjacent channel, which could create interference on the given frequency channel. Thus, the same measurement may typically appear on the lists of multiple sectors, including all sectors transmitting on the measured frequency channel or on an adjacent channel and having the proper color code, if applicable. Measurements whose power levels are outside the limits defined by the expected path loss from a given sector, as defined above, however, are not listed with that sector.

The process of classifying the measurements according to transmitting sectors now proceeds iteratively, until there are no more measurements left to classify, at an iteration step 44. The process stops either when all measurements have been assigned to sectors with sufficient confidence, or when none of the remaining, unassigned measurements can be assigned to a sector with an adequate level of confidence. The threshold confidence levels to be used for this purpose can be set by a user of processor 37. Typical default levels are noted below.

To begin the process, one of the unassigned measurements is chosen for processing, at a measurement selection step 46. Typically (although not necessarily), the strongest measurement at the location in question that has not yet been assigned is selected. The selection of a particular measurement "triggers" all sectors whose measurement lists include the selected measurement, i.e., the sectors that are known to transmit on the channel of the measurement or on adjacent frequency channels, and which match the color code of the measurement, if applicable. These sectors are candidates to "claim" the selected measurement.

For each of these candidate sectors, processor 37 calculates a significance metric, $S_j$, for assignment of the measurement to sector j, at a significance calculation step 48. The metric indicates the likelihood that the assignment is correct. In other words, if p is the probability that the assignment is erroneous, as given by equation (4) above, then the significance is an estimate of 1−p. Various methods may be used to estimate the significance or the error probability, as will be apparent to those skilled in the art, and all such methods are considered to be within the scope of the present invention. An exemplary method is described below with reference to FIG. 3. Other methods are described in the above-mentioned provisional patent application.

Among all the candidate sectors, processor 37 selects the sector with the highest calculated significance value, at a sector selection step 50. The processor tests the significance value to ensure that the assignment of the measurement to candidate sector j has an adequate level of confidence, at a significance testing step 52. Typically, the calculated significance must be no less than an absolute minimum, $S_j \geq S_{min}$, and must also be greater than the significance of all other possible assignments of this measurement by at least a relative threshold, $S_j - S_k \geq S_D$, for all other candidate sectors k. For example, $S_{min}$ may be set to 0.2, and $S_D$ to 0.05. If all applicable criteria are satisfied, the measurement is assigned to sector j, at an assignment step 54. Otherwise, the measurement is left unassigned, at a non-assignment step 56.

At step 44, as noted above, processor 37 checks the remaining unassigned measurements to determine whether there are any more measurements at the present location that could still be assigned to a sector with a sufficient confidence level. When no more measurements remain, the processor outputs the classification of the measurements by sector, at an output step 58. The process of FIG. 2 is repeated for all the locations at which drive test measurements were made.

FIG. 3 is a flow chart that schematically shows details of significance calculation step 48, in accordance with an embodiment of the present invention. The method of FIG. 3 uses the parameters defined in the following table:

TABLE I

PARAMETER DEFINITIONS

| Symbol | Definition | Units | Remarks |
|---|---|---|---|
| P | Predicted power | dBm | Based on transmitted power and path loss |
| T | Average received power among all prior measurements assigned to this sector | dBm | Based on previous iterations through step 54 |
| $R_0$ | Initial reference power | dBm | Based on prior assignments and predicted power |
| R | Tentative reference power | dBm | Includes the tentative assignment under evaluation |
| $\sigma_{R0}$ | Initial reference power accuracy | dB | Equation (8), below |
| $\sigma_R$ | Tentative reference power accuracy | dB | Equation (10), below |
| n | Number of prior assignments to this sector | | Can be 0 |
| N | Number of assignments to this sector including tentative assignments | | at least 1 |
| S | Significance level | | See below |

TABLE I-continued

PARAMETER DEFINITIONS

| Symbol | Definition | Units | Remarks |
|---|---|---|---|
| t | Current measurement received power | dBm | |
| $\bar{x}$ | Average power over measurements in a block | dBm | |
| $\sigma_P$ | Standard deviation of predicted power - assumed to be the same for all signals | dB | Specified by user - typically 30 |
| $\sigma_M$ | Standard deviation of measured power - assumed to be the same for all signals | dB | Specified by user - typically 15 |
| $F_A$ | Adjacent factor | | Specified by user - typically 0.3 |
| k | Maximal number of additional measurements to add in one iteration | | Specified by user - typically |
| K | Maximal size of reference set after adding | | Specified by user - typically 5, but must add at least one to existing set |

When considering the assignment of a selected measurement (as selected at step 46) to a candidate sector, the significance S of the assignment may be considered not only for the selected measurement itself, but also for a group of measurements, referred to as a "block," that may all be assigned to this sector. In other words, the significance is calculated both for the selected measurement by itself, and for blocks of successive measurements on different channels that may also be assigned to the candidate sector, taken from the list created for this sector at step 42. Blocks may be constructed with up to k additional measurements, beyond the selected measurement, up to a total assignment of K measurements to the sector under consideration.

The significance of an assignment of a selected measurement to a candidate sector is given by the maximum block significance, $S_P^{max}$, which is calculated over all the blocks considered for this sector:

$$S = S_f(f) S_P^{max}(t, R_0, \sigma_{R_0}) \quad (5)$$

The detailed computation of $S_P^{max}$ is described below. The significance factor $S_f$ is given by:

$$S_f(f) = \begin{cases} 1 & co \\ F_A & adjacent \\ 0 & otherwise \end{cases} \quad (6)$$

Here "co" indicates that the channel on which the measurement was made is one of the channels assigned to this sector; while "adjacent" indicates that an adjacent frequency channel is assigned to this sector. As given in the table above, the adjacent factor $F_A$ simply has a fixed, user-set value. Alternatively, $F_A$ may be variable, depending, for example, on the power level of the measurements, or on the existence or absence of alternative assignments for given measurements.

To begin the significance calculation for a particular candidate sector, processor 37 calculates the number of possible blocks, M, that may be considered, at an initialization step 60. The number of blocks is given by M=max(min(K−n, k),1). Certain parameters to be used in the calculation that follows are initialized as follows: $\bar{x} \leftarrow 0$, $R \leftarrow R_0$, $\sigma_R \leftarrow \sigma_{R_0}$, and $S_P^{max} \leftarrow 0$. The values of $R_0$ and $\sigma_{R_0}$ are calculated as follows:

$$R_0 = \frac{\frac{n}{\sigma_M^2}T + \frac{1}{\sigma_P^2}P}{\frac{n}{\sigma_M^2} + \frac{1}{\sigma_P^2}} \quad (7)$$

$$\sigma_{R_0}^2 = \frac{1}{\frac{n}{\sigma_M^2} + \frac{1}{\sigma_P^2}} \quad (8)$$

The block index i is initialized to 1. For i=1, the block contains only the power of the selected measurement, t. For i>1, the block includes the additional i−1 measurements following t on the list for the candidate sector under consideration, wherein the measurements are typically taken in order of decreasing power.

Processor 37 calculates the specific significance $S_p$ of the assignment of the measurements in block i to the candidate sector, at a block calculation step 62. Taking x to be the power of the latest measurement added to the block (i.e., x is measurement t for i=1, or the (i−1)th measurement after t otherwise), the average power for the block is given by $$\bar{x} \leftarrow \frac{i-1}{i}\bar{x} + \frac{1}{i}x.$$

The reference power and reference power accuracy for the block are given by:

$$R \leftarrow \frac{\frac{1}{\sigma_M^2}x + \frac{1}{\sigma_R^2}R}{\frac{1}{\sigma_M^2} + \frac{1}{\sigma_R^2}} \quad (9)$$

$$\sigma_R^2 \leftarrow \frac{1}{\frac{1}{\sigma_M^2} + \frac{1}{\sigma_R^2}} \quad (10)$$

The specific significance for block i is then given by:

$$S_P \leftarrow 2\left[1 - \Phi\left(\frac{|\bar{x} - R|}{\sqrt{\sigma_R^2}}\right)\right] \quad (11)$$

wherein $\Phi$ is the distribution function of a standard normal distribution:

$$\Phi(z) = \int_{-\infty}^{z} \frac{1}{\sqrt{2\pi}} e^{-\frac{t^2}{2}} dt.$$

Processor 37 tests the specific significance it has calculated at step 62 against the current value of $S_P^{max}$, at a significance testing step 64. If the assignment of all the measurements in block i is found to have greater significance than that of block i−1, i.e., $S_P > S_P^{max}$, then the current value of $S_P$ becomes the new value of $S_P^{max}$, at a significance update step 66. (Of course, for i=1, $S_P^{max}$ is simply set equal to $S_P$.) The block index i is then incremented to the next value, at a block incrementation step 68. The incremented index is tested against the maximum number of blocks M, at an index testing step 70. As long as i has not exceeded M, the processor may continue to test blocks of increasing size. In this case, the processor verifies that there are further measurements remaining on the list for the candidate sector under consideration, at a measurement verification step 72. If so, the processor takes the next measurement from the list to create the next block, and returns to step 62 to calculate the specific significance for this new block.

The process of steps 62–72 continues iteratively until the maximum block size is reached at step 70, or the list of measurements is exhausted at step 72, or the value of $S_P$ calculated for the current block is found to be less than the previous value, $S_P^{max}$, at step 64. In all these cases, the process terminates, and the block size i and significance $S_P^{max}$ are recorded, at a termination step 74. Equation (5) is used to determine the significance S of the assignment of the selected measurement to the sector under consideration. This means that if the selected measurement (i.e., the first measurement in the block) is in an adjacent channel, rather than a channel assigned to this sector, the significance is weighted by the factor $F_A$.

The significance value thus calculated is used at steps 50 and 52 in the method shown in FIG. 2, in order to determine the candidate sector to which the selected measurement should be assigned. Note, however, that although the "winning" significance value may have been calculated for a block of multiple measurements, as described above, typically only the selected measurement—the first measurement in the block—is actually assigned to the winning sector at step 54. The remaining measurements are evaluated in subsequent iterations through the method of FIG. 2. It may be found that there are alternative assignments for these remaining measurements that will have higher significance. Alternatively, in order to streamline the classification of measurement results, two or more measurements in a given block may be classified in a single iteration.

The definition of "significance" expressed above in equations (9), (10) and (11) is heuristic, and other significance metrics may likewise be defined and used, as will be apparent to those skilled in the art. For example, the following alternative formulation uses the parameters $\omega_R$ and $\omega_M$, which are initialized as follows:

$$\omega_R \leftarrow \frac{1}{\sigma_{R_0}^2}, \quad \omega_M = \frac{1}{\sigma_M^2}.$$

The specific significance $S_P$ for each block is then calculated at step 62 as follows:

$$R \leftarrow \frac{\omega_M x + \omega_R R}{\omega_M + \omega_R} \quad (12)$$

$$\omega_R \leftarrow \omega_M + \omega_R \quad (13)$$

$$S_P \leftarrow 2[1 - \Phi(\sqrt{\omega_R}\,|\bar{x} - R|)] \quad (14)$$

Aside from these changes, determination of $S_P^{max}$ and selection of the sector with which to associate the measurement proceed substantially as described above.

In an alternative embodiment of the present invention, which is described hereinbelow, the effects of "masking" between different sectors are taken into account, as are the different channel types (voice or control). "Masking" in this context refers to the probability that a signal transmitted from a certain sector on a given channel will not be detected due to stronger transmission on the same channel by another sector. (It is assumed that no more than one signal, from a single sector, can be measured on any given frequency channel in a given time slot.) The present embodiment is also capable of estimating a Received Signal Strength Indicator (RSSI) for each sector. For simplicity, this embodiment does not consider blocks of measurements, as described above, but rather looks at individual measurements one by one. It will be apparent to those skilled in the art, however, that block estimation may likewise be applied to the method described below, and that other features of the different embodiments described herein may also be combined to provide further alternative implementations of the present invention.

Table II below lists parameters that are used in this alternative embodiment. Some of these parameters are also listed in Table I, but may be used differently or have different values in the embodiment described below.

TABLE II

PARAMETER DEFINITIONS

| Symbol | Definition | Units | Remarks |
|---|---|---|---|
| P | Predicted power | dBm | Based on transmitted power and path loss |
| T | Average received power among all prior measurements assigned to this sector | dBm | Based on previous iterations through step 54 |
| $R_0$ | Initial reference power | dBm | Based on prior assignments and predicted power - equation (20) below |
| R | Predicted RSSI for this sector | dBm | Equation (22) below |
| $\sigma_{R0}$ | Reference power accuracy | dB | Equation (21) below |
| n | Number of prior assignments to this sector | | Can be 0 |
| N | Number of assignments to this sector including tentative assignments | | At least 1 |
| S | Significance level | | See below |
| x | Current measurement received power | dBm | |
| $P_{D/T}$ | Unmask probability | | Conditional probability to detect a signal given transmission |
| $P_T$ | Transmit probability | | |
| $P_D$ | Detection probability of a signal | | $P_D = P_T \cdot P_{D/T}$ |
| $\omega$ | Weight of the current assignment | | Equation (23) below |
| $\sigma_P$ | Standard deviation of predicted power - assumed to be the same for all signals | dB | Specified by user - typically 15 in this embodiment |
| $\sigma_V$ | Voice power control standard deviation | dB | Specified by user - typically 7 for GSM networks, 5 for |

TABLE II-continued

PARAMETER DEFINITIONS

| Symbol | Definition | Units | Remarks |
|---|---|---|---|
| | | | TDMA. Can be tuned automatically per sector. |
| $\sigma_C$ | Control power | dB | Specified by user - typically 0 |
| $\mu_V$ | Average transmit power difference between control and voice channels. | dB | Specified by user - typically 12 for GSM networks, 10 for TDMA. Can be tuned automatically per sector. |
| $\sigma_E$ | Measurement standard deviation when no power control is involved (within measurements) | dB | Specified by user - typically 4 |
| $\sigma_0$ | Minimal standard deviation to consider when classifying | dB | Specified by user - typically 4 |
| $\sigma_{CC}$ | Additional standard deviation due to color code retrieval | dB | Specified by user - typically 20 |
| $P_{T/V}$ | Transmit probability for voice channel | | Specified by user - typically 0.5 for GSM, 0.7 for TDMA |
| $F_A$ | Adjacent factor | | Specified by user - typically 0.8 in this embodiment |
| $\mu_{adj}$ | Minimum power gain for adjacent channel | dB | Specified by user - typically 18 for GSM, 40 for TDMA |
| $\sigma_{adj}$ | Standard deviation for adjacent channel power | dB | Specified by user - typically 6 for GSM, 8 for TDMA |
| $S_{min}$ | Minimal significance | | Specified by user - typically 0.1 in this embodiment |
| $R_S$ | Minimal significance ratio | | Specified by user - typically 2 |
| M | Masking C/I | dB | Required C/I ratio for one signal to mask another - specified by user, typically 8 |
| $\omega_0$ | Minimal cumulative significance to generate results | | Specified by user - typically 0.2 |
| $F_{CC}$ | Missing color code factor | | Specified by user - typically 0.8 for GSM, 0.6 for TDMA |
| $\delta_1$ | Prediction filter value with retrieved color code | dB | Specified by user - typically 60 |
| $\delta_0$ | Prediction filter value without retrieved color code | dB | Specified by user - typically 30 |

The method of the present embodiment follows generally the flow that is shown in FIG. 2 and described hereinabove with reference thereto. At step 42, for each measurement x on a given frequency channel, a sector will be identified as a candidate for association with the measurement if the following conditions are met:

1. If the measurement includes a color code, it is the same as the color code of the sector.
2. The frequency channel of the measurement is one of the frequency channels assigned to the sector or is adjacent to one of the frequency channels assigned to the sector.
3. The measured power is in accord with the predicted power for the sector to within the following criterion:

$$P \in [x + \Delta_{CV} + \Delta_{CA} - \Delta_{CC}, x + \Delta_{CV} + \Delta_{CA} - \Delta_{CC}] \quad (15)$$

wherein the difference parameters in equation (15) are defined as follows:

$$\Delta_{CV} = \begin{cases} 0 & \text{control} \\ \mu_V & \text{voice} \end{cases} \quad (16)$$

$$\Delta_{CA} = \begin{cases} 0 & \text{co} \\ \mu_{adj} & \text{adjacent} \end{cases}$$

$$\Delta_{CC} = \begin{cases} \delta_1 & \text{with color code} \\ \delta_0 & \text{without color code} \end{cases}$$

In the above definitions, "co" indicates that the channel on which the measurement was made is one of the channels assigned to the candidate sector; while "adjacent" indicates that an adjacent frequency channel is assigned to the candidate sector.

The present method also takes into account the probability that a signal transmitted by a given sector is not masked by transmission from another sector transmitting on the same frequency or an adjacent frequency. A sector is a candidate to mask another sector with respect to a given measurement x if conditions 1 and 2 above are satisfied, and if the predicted power P satisfies:

$$P \geq x + \Delta_{CV} + \Delta_{CA} - \Delta_{CC} \quad (17)$$

Moving on to step 48 in FIG. 2, the significance of assignment of a given measurement to each candidate sectors is now determined. The specific significance in this case is weighted by the detection probability and color code factor, as defined above:

$$S_P = P_D S_f(f) S_{CC} S(x, R_0, \sigma_{R_0}) \quad (18)$$

The parameters in this equation are defined above, except for $S_{CC}$, which is assigned the value 1 for a measurement with a color code, and the value $F_{CC}$ otherwise.

Before beginning to calculate the values of $P_D$ and S, the values of the reference power and other parameters are initialized as follows: $R_0 \leftarrow P$, $\sigma_{R_0}^2 \leftarrow \sigma_P^2$, $R \leftarrow 0$, $\omega \leftarrow 0$. The significance S for each candidate sector is then determined by the following steps, based on the parameters defined in Table II above:

1. $\sigma^2 \leftarrow \sigma_E^2 + \sigma_{R_0}^2 + \sigma_0^2$, $\mu \leftarrow 0$
2. If the channel in question is a voice channel in the candidate sector, $$\sigma^2 \leftarrow \sigma^2 + \sigma_V^2$$
$$\mu \leftarrow \mu + \mu_V$$ ;

else $\sigma^2 \leftarrow \sigma^2 + \sigma_C^2$.

3. If the channel in question in the candidate sector is adjacent to the frequency channel of the measurement, $$\sigma^2 \leftarrow \sigma^2 + \sigma_{adj}^2$$
$$\mu \leftarrow \mu + \mu_{adj}$$ .

4. If the color code of the measurement is known, $\sigma^2 \leftarrow \sigma^2 + \sigma_{CC}^2$.

5. $S \leftarrow 2\left[1 - \Phi\left(\frac{|x + \mu - R_0|}{\sqrt{\sigma^2}}\right)\right].$ The detection probability $P_D$ of the signal transmitted by a given candidate sector on the frequency channel in question is determined by $P_T$ and $P_{D/T}$, as defined in Table II above. The value of the transmit probability $P_T$ depends on characteristics of the network, as well as on whether the drive test measurements are made in a single time slot, or averaged over multiple time slots. For convenience, $P_T$ can be set equal to one if the channel in question in the candidate sector is a control channel, and to the fixed value $P_{T/V}$ for voice channels. Alternatively, more complex schemes may be used to determine $P_T$. The values of the parameters $\mu_V$ and $\sigma_V$ may likewise be adjusted depending on whether single- or multi-time slot measurements are made.

The value of the unmask probability $P_{D/T}$ can be determined by the following equation (19):

$$P_{D/T} = P_{D/T}(0)$$
$$= \prod_{i=1}^{m}\left(1 - P_T(i)S_f(i)\left[1 - \Phi\left(\frac{M - (R_0(i) - \Delta(i) - R_0(0) + \Delta(0))}{\sqrt{\sigma_{R_0}^2(0) + \sigma_{R_0}^2(i) + \sigma_0^2}}\right)\right]\right)$$

In this equation, it is assumed that there are m candidate sectors for assignment of the measurement in question, and $P_{D/T}$ is calculated for sector 0 by taking a product of probabilities over all the other sectors that may mask the signal of the candidate sector. The difference parameter $\Delta$ in equation (19) is given by $\Delta(i)=\Delta_{CV}(i)+\Delta_{CA}(i)$, wherein $\Delta_{CV}$ and $\Delta_{CA}$ for sector i are given by equation (16) above. Equation (19) actually encompasses four different cases, with respect to the candidate sector (0) and the potential masking sector:

1. The channel in question is a control channel in both the candidate and masking sectors:

$$P_{D/T} = P_{D/T}(0)$$
$$= \prod_{i=1}^{m}\left(1 - \left[1 - \Phi\left(\frac{M - (R_0(i) - R_0(0))}{\sqrt{\sigma_{R_0}^2(0) + \sigma_{R_0}^2(i) + \sigma_0^2}}\right)\right]\right)$$

2. The channel in question is a voice channel in both the candidate and masking sectors:

$$P_{D/T} = P_{D/T}(0)$$
$$= \prod_{i=1}^{m}\left(1 - P_T(i)\left[1 - \Phi\left(\frac{M - (R_0(i) - R_0(0))}{\sqrt{\sigma_{R_0}^2(0) + \sigma_{R_0}^2(i) + \sigma_0^2}}\right)\right]\right)$$

3. The channel in question is a control channel in the candidate sector and a voice channel in the masking sector:

$$P_{D/T} = P_{D/T}(0)$$

-continued
$$= \prod_{i=1}^{m}\left(1 - P_T(i)\left[1 - \Phi\left(\frac{M - (R_0(i) - \mu_V - R_0(0))}{\sqrt{\sigma_{R_0}^2(0) + \sigma_{R_0}^2(i) + \sigma_0^2}}\right)\right]\right)$$

4. The channel in question is a voice channel in the candidate sector and a control channel in the masking sector:

$$P_{D/T} = P_{D/T}(0)$$
$$= \prod_{i=1}^{m}\left(1 - \left[1 - \Phi\left(\frac{M - (R_0(i) + \mu_V - R_0(0))}{\sqrt{\sigma_{R_0}^2(0) + \sigma_{R_0}^2(i) + \sigma_0^2}}\right)\right]\right).$$

After the specific significance $S_P$ has been calculated for each candidate sector, in accordance with equation (18), the sector with highest significance is chosen at step 50, as described above, and is then tested at step 52. Assuming $S_1$ to be the significance of the chosen sector, and $S_2$ to be the next-highest significance calculated among the remaining candidates, the measurement in question will be assigned to the sector with highest significance, at step 54, only if the following criteria are satisfied: $S_1 \geq S_{min}$ and $$\frac{S_1}{S_2} \geq R_S.$$

The procedure then continues at step 44 with the next measurement on the list.

After a measurement has been assigned to a particular candidate sector at step 54, the reference power and variance values for that sector receive updated values, for use in subsequent significance calculations. For this purpose, the values of $\mu$ and $\sigma$ determined at the previous pass through step 48 are used in calculating the parameters $x \leftarrow x+\mu$ and $\sigma_x^2 \leftarrow \sigma^2 - \sigma_{R_0}^2 - \sigma_0^2$. For color-coded channels, the color code variance $\sigma_{CC}^2$ is also eliminated from $\sigma^2$. The reference power and reference power accuracy are then recalculated as follows:

$$R_0 \leftarrow \frac{\frac{1}{\sigma_x^2}x + \frac{1}{\sigma_{R_0}^2}R_0}{\frac{1}{\sigma_x^2} + \frac{1}{\sigma_{R_0}^2}} \tag{20}$$

$$\sigma_{R_0}^2 \leftarrow \frac{1}{\frac{1}{\sigma_x^2} + \frac{1}{\sigma_{R_0}^2}} \tag{21}$$

The predicted RSSI and weight (originally initialized to zero) are now given by:

$$R \leftarrow \frac{\omega R + \frac{S_P}{\sigma_x^2}x}{\omega + \frac{S_P}{\sigma_x^2}} \tag{22}$$

-continued $$\omega \leftarrow \omega + \frac{S_P}{\sigma_x^2} \quad (23)$$

Upon the conclusion of the assignment process, at step 58, processor 37 may output not only the measurement assignments, but also the estimated RSSI for each sector, given by the final value of R, as long as the weight ω satisfies the requirement that $\omega \geq \omega_0$.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for analyzing service in a wireless communication network, which includes multiple antennas, which are assigned to transmit signals over the air to mobile units on respective sets of one or more frequency channels, such that at least two of the antennas transmit the signals on a common frequency channel, the method comprising:

recording levels of the signals received at multiple locations within a service area of the network, while the antennas are transmitting the signals on the respective sets of frequency channels, including simultaneous transmission by the at least two of the antennas on the common frequency channel; and analyzing the recorded levels and the frequency channels of the received signals so as to classify the received signals at each of the locations according to the antennas transmitting the signals.

2. The method according to claim 1, wherein recording the levels of the signals comprises recording the levels using a receiver mounted in a vehicle, while the vehicle travels through the service area.

3. The method according to claim 1, wherein the wireless communication network comprises a cellular network, and wherein analyzing the recorded levels and the frequency channels comprises classifying the received signals as originating from cells or sectors of the cellular network that are respectively served by the antennas.

4. The method according to claim 3, wherein classifying the received signals further comprises decoding a color code that is encoded in at least some of the signals, and assigning the signals to the cells or sectors responsively to the color code.

5. The method according to claim 1, wherein recording the levels comprises recording first and second levels of first and second signals received at one of the locations on first and second frequency channels, respectively, and wherein analyzing the recorded levels and the frequency channels comprises classifying the first signal as having originated from one of the antennas and, responsively to having classified the first signal, classifying the second signal.

6. The method according to claim 5, wherein classifying the first signal comprises computing a first metric with respect to the first signal, indicative of which of the antennas is likeliest, among the antennas transmitting on the first frequency channel, to have transmitted the first signal, and determining a classification of the first signal responsively to the first metric, and wherein classifying the second signal comprises computing a second metric, indicative of which of the antennas is likeliest, among the antennas transmitting on the second frequency channel, to have transmitted the second signal, wherein the second metric is computed subject to the classification of the first signal.

7. The method according to claim 5, wherein the first signal is classified as having originated from a first one of the antennas, and wherein classifying the second signal comprises classifying the second signal as having originated from a second one of the antennas, different from the first one.

8. The method according to claim 5, wherein the first signal is classified has having originated from a first one of the antennas, and wherein classifying the second signal comprises classifying the second signal as having originated from the first one of the antennas, in addition to the first signal having originated therefrom.

9. The method according to claim 5, wherein recording the levels further comprises recording a third level of a third signal received at the one of the locations on a third frequency channel, and wherein analyzing the recorded levels and the frequency channels comprises classifying the third signal responsively to having classified the first and second signals.

10. The method according to claim 1, wherein analyzing the recorded levels and the frequency channels comprises sorting the recorded levels so as to generate a respective list, for each of at least some of the antennas, comprising measurements of the levels of the signals recorded at the one of the locations on the respective sets of frequency channels that are assigned to the antennas, and classifying the received signals based on the list.

11. The method according to claim 10, wherein classifying the received signals comprises:

computing a metric with respect to a group of the measurements in the respective list generated with respect to at least one of the antennas, wherein the metric is indicative of a likelihood that the at least one of the antennas transmitted the signals whose measurements are included in the group; and determining a classification of at least a first signal in the respective list responsively to the metric.

12. The method according to claim 11, wherein computing the metric comprises computing multiple, respective metrics for multiple groups of the measurements, and selecting a maximal metric from among the multiple metrics.

13. The method according to claim 1, wherein the at least two of the antennas transmitting on the common frequency channel comprise first and second antennas, and wherein analyzing the recorded levels and the frequency channels comprises computing respective first and second metrics, indicative of which of the first and second antennas is likelier to have transmitted a signal that was received on the common frequency channel, and classifying the signal based on the first and second metrics.

14. The method according to claim 13, wherein computing the respective first and second metrics comprises estimating respective probabilities of error in assigning the signal to each of the first and second antennas.

15. The method according to claim 13, wherein the first and second antennas are assigned to transmit the signals on first and second frequency channels, which are mutually adjacent, and wherein the common frequency channel is the first frequency channel, and wherein computing the second metric comprises adjusting the second metric responsively to the transmission by the second antenna on the second, adjacent frequency channel.

16. The method according to claim 13, wherein computing the first and second metrics comprises comparing the signal that was received on the common frequency channel to respective estimated path loss characteristics associated with the transmission of the signal from each of the first and second antennas, and adjusting the metrics in response to the path loss characteristics.

17. The method according to claim 1, wherein analyzing the recorded levels and the frequency channels comprises calculating a probability that a first signal transmitted by a first one of the at least two antennas is masked by a second signal transmitted by a second one of the at least two antennas, and classifying the signals based on the probability.

18. The method according to claim 1, wherein analyzing the recorded levels and the frequency channels further comprises estimating a received signal strength indicator (RSSI) with respect to at least one of the antennas.

19. Apparatus for analyzing service in a wireless communication network, which includes multiple antennas, which are assigned to transmit signals over the air to mobile units on respective sets of one or more frequency channels, such that at least two of the antennas transmit the signals on a common frequency channel, the apparatus comprising a test processor, which is adapted to receive levels of the signals measured at multiple locations within a service area of the network, while the antennas are transmitting the signals on the respective sets of frequency channels, including simultaneous transmission by the at least two of the antennas on the common frequency channel, and which is adapted to analyze the levels and the frequency channels of the measured signals so as to classify the measured signals at each of the locations according to the antennas transmitting the signals.

20. The apparatus according to claim 19, and comprising a receiver mounted in a vehicle, which is adapted to measure the levels of the signals while the vehicle travels through the service area.

21. The apparatus according to claim 19, wherein the wireless communication network comprises a cellular network, and wherein the processor is adapted to classify the received signals as originating from cells or sectors of the cellular network that are respectively served by the antennas.

22. The apparatus according to claim 21, wherein a color code is encoded in at least some of the signals, and wherein the processor is adapted to assign the signals to the cells or sectors responsively to the color code.

23. The apparatus according to claim 19, wherein the levels of the signals comprise at first and second levels of first and second signals received at one of the locations on first and second frequency channels, respectively, and wherein the processor is adapted to classify the first signal as having originated from one of the antennas and, responsively to having classified the first signal, to classify the second signal.

24. The apparatus according to claim 23, wherein the processor is adapted to classify the first signal by computing a first metric with respect to the first signal, indicative of which of the antennas is likeliest, among the antennas transmitting on the first frequency channel, to have transmitted the first signal, and determining a classification of the first signal responsively to the first metric, and is further adapted to classify the second signal by computing a second metric, indicative of which of the antennas is likeliest, among the antennas transmitting on the second frequency channel, to have transmitted the second signal, wherein the second metric is computed subject to the classification of the first signal.

25. The apparatus according to claim 23, wherein the processor is adapted to classify the first signal as having originated from a first one of the antennas, and to classify the second signal as having originated from a second one of the antennas, different from the first one.

26. The apparatus according to claim 23, wherein the processor is adapted to classify both the first and second signals as having originated from a first one of the antennas.

27. The apparatus according to claim 23, wherein the levels of the signals further comprise a third level of a third signal received at the one of the locations on a third frequency channel, and wherein the processor is adapted to classify the third signal responsively to having classified the first and second signals.

28. The apparatus according to claim 19, wherein the processor is adapted to sort the measured signals so as to generate a respective list, for each of at least some of the antennas, comprising measurements of the levels of the signals recorded at the one of the locations on the respective sets of frequency channels that are assigned to the antennas, and to classify the received signals based on the list.

29. The apparatus according to claim 28, wherein the processor is adapted to compute a metric with respect to a group of the measurements in the respective list generated with respect to at least one of the antennas, wherein the metric is indicative of a likelihood that the at least one of the antennas transmitted the signals whose measurements are included in the group, and to determine a classification of at least a first signal in the respective list responsively to the metric.

30. The apparatus according to claim 29, wherein the processor is adapted to compute multiple, respective metrics for multiple groups of the measurements, and to select a maximal metric from among the multiple metrics for use in determining the classification.

31. The apparatus according to claim 19, wherein the at least two of the antennas transmitting on the common frequency channel comprise first and second antennas, and wherein the processor is adapted to compute respective first and second metrics, indicative of which of the first and second antennas is likelier to have transmitted a signal that was received on the common frequency channel, and to classify the signal based on the first and second metrics.

32. The apparatus according to claim 31, wherein the respective first and second metrics are indicative of respective probabilities of error in assigning the signal to each of the first and second antennas.

33. The apparatus according to claim 31, wherein the first and second antennas are assigned to transmit the signals on first and second frequency channels, which are mutually adjacent, and wherein the common frequency channel is the first frequency channel, and wherein the processor is adapted to adjust the second metric responsively to the transmission by the second antenna on the second, adjacent frequency channel.

34. The apparatus according to claim 31, wherein the processor is adapted to compare the signal that was received on the common frequency channel to respective estimated path loss characteristics associated with the transmission of the signal from each of the first and second antennas, and to adjust the metrics in response to the path loss characteristics.

35. The apparatus according to claim 19, wherein the processor is adapted to calculate a probability that a first signal transmitted by a first one of the at least two antennas is masked by a second signal transmitted by a second one of the at least two antennas, and to classify the signals based on the probability.

36. The apparatus according to claim 19, wherein the processor is adapted to estimate, based on the levels and frequency channels of the measured signals, a received signal strength indicator (RSSI) with respect to at least one of the antennas.

37. A computer software product for analyzing service in a wireless communication network, which includes multiple antennas, which are assigned to transmit signals over the air to mobile units on respective sets of one or more frequency channels, such that at least two of the antennas transmit the signals on a common frequency channel, the product comprising a computer readable medium, in which program instructions are stored, which instructions, when read by a computer, cause the computer to receive levels of the signals measured at multiple locations within a service area of the network, while the antennas are transmitting the signals on the respective sets of frequency channels, including simultaneous transmission by the at least two of the antennas on the common frequency channel, and further cause the computer to analyze the levels and the frequency channels of the measured signals so as to classify the measured signals at each of the locations according to the antennas transmitting the signals.

38. The product according to claim 37, wherein the levels of the signals are measured by a receiver mounted in a vehicle, while the vehicle travels through the service area.

39. The product according to claim 37, wherein the wireless communication network comprises a cellular network, and wherein the instructions cause the computer to classify the received signals as originating from cells or sectors of the cellular network that are respectively served by the antennas.

40. The product according to claim 39, wherein a color code is encoded in at least some of the signals, and wherein the instructions cause the computer to assign the signals to the cells or sectors responsively to the color code.

41. The product according to claim 37, wherein the levels of the signals comprise at first and second levels of first and second signals received at one of the locations on first and second frequency channels, respectively, and wherein the instructions cause the computer to classify the first signal as having originated from one of the antennas and, responsively to having classified the first signal, to classify the second signal.

42. The product according to claim 41, wherein the instructions cause the computer to classify the first signal by computing a first metric with respect to the first signal, indicative of which of the antennas is likeliest, among the antennas transmitting on the first frequency channel, to have transmitted the first signal, and determining a classification of the first signal responsively to the first metric, and further cause the computer to classify the second signal by computing a second metric, indicative of which of the antennas is likeliest, among the antennas transmitting on the second frequency channel, to have transmitted the second signal, wherein the second metric is computed subject to the classification of the first signal.

43. The product according to claim 42, wherein the instructions cause the computer to classify the first signal as having originated from a first one of the antennas, and to classify the second signal as having originated from a second one of the antennas, different from the first one.

44. The product according to claim 42, wherein the instructions cause the computer to classify both the first and second signals as having originated from a first one of the antennas.

45. The product according to claim 42, wherein the levels of the signals further comprise a third level of a third signal received at the one of the locations on a third frequency channel, and wherein the instructions cause the computer to classify the third signal responsively to having classified the first and second signals.

46. The product according to claim 37, wherein the instructions cause the computer to sort the measured signals so as to generate a respective list, for each of at least some of the antennas, comprising measurements of the levels of the signals recorded at the one of the locations on the respective sets of frequency channels that are assigned to the antennas, and to classify the received signals based on the list.

47. The product according to claim 46, wherein the instructions cause the computer to compute a metric with respect to a group of the measurements in the respective list generated with respect to at least one of the antennas, wherein the metric is indicative of a likelihood that the at least one of the antennas transmitted the signals whose measurements are included in the group, and to determine a classification of at least a first signal in the respective list responsively to the metric.

48. The product according to claim 47, wherein the instructions cause the computer to compute multiple, respective metrics for multiple groups of the measurements, and to select a maximal metric from among the multiple metrics for use in determining the classification.

49. The product according to claim 37, wherein the at least two of the antennas transmitting on the common frequency channel comprise first and second antennas, and wherein the instructions cause the computer to compute respective first and second metrics, indicative of which of the first and second antennas is likelier to have transmitted a signal that was received on the common frequency channel, and to classify the signal based on the first and second metrics.

50. The product according to claim 49, wherein the respective first and second metrics are indicative of respective probabilities of error in assigning the signal to each of the first and second antennas.

51. The product according to claim 49, wherein the first and second antennas are assigned to transmit the signals on first and second frequency channels, which are mutually adjacent, and wherein the common frequency channel is the first frequency channel, and wherein the instructions cause the computer to adjust the second metric responsively to the transmission by the second antenna on the second, adjacent frequency channel.

52. The product according to claim 49, wherein the instructions cause the computer to compare the signal that was received on the common frequency channel to respective estimated path loss characteristics associated with the transmission of the signal from each of the first and second antennas, and to adjust the metrics in response to the path loss characteristics.

53. The product according to claim 37, wherein the instructions cause the computer to calculate a probability that a first signal transmitted by a first one of the at least two antennas is masked by a second signal transmitted by a second one of the at least two antennas, and to classify the signals based on the probability.

54. The apparatus according to claim 37, wherein the instructions cause the computer to estimate, based on the levels and frequency channels of the measured signals, a received signal strength indicator (RSSI) with respect to at least one of the antennas.

* * * * *